Figure 1:
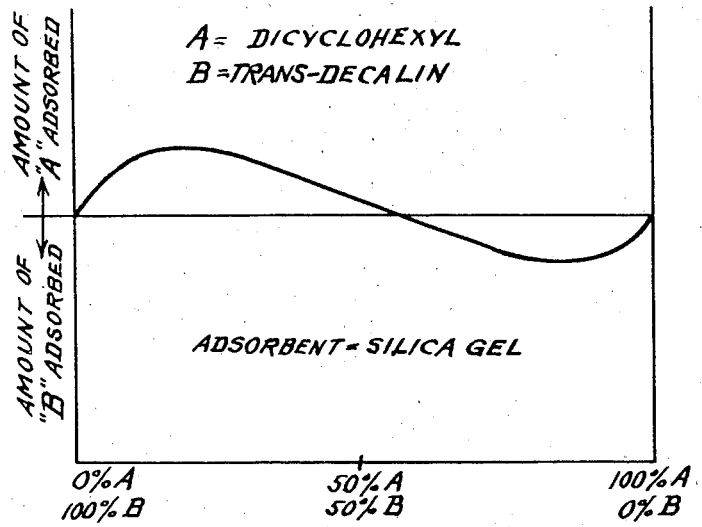

Patented Aug. 31, 1948

2,448,488

UNITED STATES PATENT OFFICE 2,448,488

PURIFICATION OF NAPHTHENIC HYDROCARBONS

Alfred E. Hirschler, Drexel Hill, Pa., assignor to Sun Oil Company, Philadelphia, Pa., a corporation of New Jersey Application January 26, 1946, Serial No. 643,763

17 Claims. (Cl. 260—666)

This invention relates to the separation of hydrocarbons of the naphthenic type. The invention is particularly directed to a method of preparing a naphthene of high purity from a mixture containing one or more other naphthene hydrocarbons of molecular weight or boiling point not greatly different from that of the desired hydrocarbon.

In the preparation of individual hydrocarbons by organic synthesis, it is seldom that the desired hydrocarbon may be produced directly in a high state of purity. Generally a mixture of hydrocarbons is formed, which includes isomers of the desired hydrocarbon and other related compounds which may boil relatively close to the desired hydrocarbon. A usual procedure of purification involves distillation under fractionating conditions whereby removal of compounds having boiling points sufficiently different from that of the desired hydrocarbon may be accomplished. It is often the case, however, that a high degree of purity may not be attained in this manner, or may be obtained only with great difficulty, due to the proximity of boiling points of the various compounds. Likewise, in the separation of a particular hydrocarbon from a complex hydrocarbon mixture such as petroleum or coal tar fractions, it is often extremely difficult to segregate the desired component as a product of high purity due to the presence of other compounds of close boiling points. While the use along with straight distillation of other procedures, such as solvent extraction and azeotropic distillation, has resulted in improved separations in certain cases, generally speaking it has not been practical heretofore to produce hydrocarbons of high purity from mixtures containing very closely related hydrocarbons. Usually the best that has been done from a practical aspect is to prepare hydrocarbons of technical purity, such as in concentrations in the order of 80% to 95%. To produce hydrocarbons in a high state of purity, for example in concentrations better than 95%, from mixtures containing close boiling compounds of similar hydrocarbon type heretofore has been extremely difficult and, in many cases, practically impossible.

The present invention provides an improved method whereby relatively pure hydrocarbons of the naphthenic class may be prepared. It is especially useful when the starting material contains as the impurity a minor amount of one or more related hydrocarbons boiling close to the desired compound, as when its isomers or its nearest homologues constitute the impurity. The purification is accomplished according to the invention by selective adsorption, utilizing as the adsorbent silica gel or any similar adsorbent which conforms substantially to silica gel in adsorptive properties.

It is well known that hydrocarbons may be separated to an extent according to chemical type by selective adsorption on silica gel or like adsorbents. This procedure has been utilized to separate aromatics and olefins from saturated hydrocarbons (i. e. naphthenes and paraffins). It is also known that two compounds of a given hydrocarbon class which have greatly different molecular weights may exhibit sufficient difference in adsorbability so that partial separation may be effected by selective adsorption. However, it has heretofore been thought that hydrocarbons of the same class which do not differ greatly in molecular weight, as for example when there is a difference of not more than three carbon atoms per molecule and especially when the hydrocarbons are isomers or adjacent homologues, have adsorbabilities so nearly the same that for all practical purposes no separation could be effected by adsorption.

I have now found that naphthene hydrocarbons which are closely related, as judged by the number of carbon atoms per molecule or the proximity of their boiling points, nevertheless have sufficiently different adsorbabilities under certain conditions to be separable by selective adsorption. Although it is often true that two related naphthenes will be adsorbed to about the same extent from a mixture when they are present in certain definite proportions, this will not be the case when the two naphthenes are present in proportions substantially different from said definite proportions. I have found that it is always possible to effect a separation by selective adsorption if a starting mixture is selected in which the proportions of the components are such that their adsorbabilities are substantially different.

In many cases the two naphthenes will be adsorbed from the mixture to about the same extent when they are present in about equal proportions or at least in proportions which are not greatly different; whereas when such hydrocarbons are present in greatly different proportions, either component may be purified dependent upon which of the components is present in small amount in the starting mixture. I have found that with hydrocarbon pairs of this type the hydrocarbon which is present in small amount is selectively removed. Further, I have found that the smaller the amount of the hydrocarbon the more easily its removal may be effected, which is in contrast to other separation methods such as distillation or solvent extraction wherein the separation becomes more difficult as the amount of a component decreases.

With some pairs of closely related naphthenes, I have found that binary mixtures are obtained from which, unexpectedly, one of the components will be preferentially adsorbable at substantially all concentrations or at least at all concentrations except where the component is extremely pure. This component therefore may be selectively removed from the mixture substantially regardless of the proportions of the hydrocarbons.

In other cases pairs of closely related naphthenes will exhibit a behavior intermediate of the above two cases; that is, one component will be preferentially adsorbed throughout a large part of the concentration range while the other component will be preferentially adsorbable over only a small although substantial part of the range. With such pairs of naphthenic hydrocarbons, a mixture containing the large amount of first component and the small amount of second component will not be separable by adsorption, but mixtures in which the proportions are substantially different from this will be separable.

With any given pair of closely related naphthenes, it has not been possible thus far to predict which type of behavior will be exhibited and it has been necessary to predetermine the effect of proportions on relative adsorbabilities. From this it may be ascertained within what composition range the starting material should lie in order that its components may be purified in accordance with the invention.

The accompanying drawings are schematic illustrations of the types of behavior of hydrocarbon pairs as discussed above. Each figure represents approximately the type of adsorption isotherm obtained for certain closely related hydrocarbon pairs throughout the complete composition range of 0 to 100% for each component. As is well known, the adsorption isotherms show the relationship between composition of the mixture at equilibrium with a given amount of adsorbent and the amount of component adsorbed. (The latter value is the "apparent" amount as customarily calculated from the change in composition of the mixture before and after adsorption assuming no adsorption of the other component.)

Figure 1 shows the adsorption isotherm for two naphthenes, viz. dicyclohexyl and trans-decalin. As shown, when these two naphthenes are present in certain proportions which are approximately equal or at least not greatly different, neither is preferentially adsorbed from the mixture. On the other hand, when dicyclohexyl is present in small proportion, it is selectively adsorbed; and when trans-decalin is the component present in small amount, it is the one that is selectively removed. Either component may therefore be prepared in a highly purified state by selecting as starting material a mixture containing a large amount of the desired component and a small amount of the other component, for example, by utilizing a technical grade of the desired material as the charge stock. Thus, highly pure dicyclohexyl may be prepared in accordance with the invention by treating a technical grade of this compound containing as impurity say 5-20% trans-decalin with silica gel to selectively remove the latter. In like manner pure trans-decalin may be prepared from a mixture in which it is the component present in large amount. Another example of a pair of naphthenes which behave substantially in this manner is cyclohexane and ethylcyclohexane.

Figure 2:
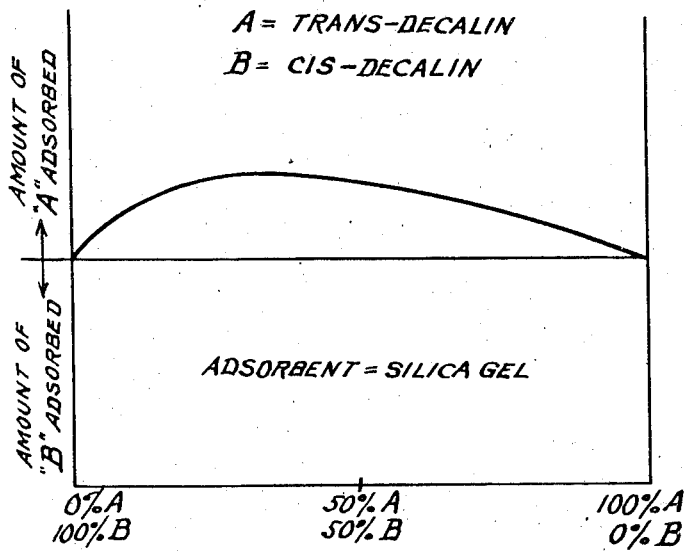

Figure 2 shows the adsorption isotherm for trans-decalin and cis-decalin. While such closely related compounds would heretofore have been expected to exhibit no appreciable difference in adsorbabilities, they are, in fact, so different that the trans compound is selectively adsorbed over substantially the whole concentration range. With this type of mixture it is possible to start with practically any concentration and removed the more adsorbable component from the mixture. Thus, by treating a mixture of the two forms of decalin with an adsorbent such as silica gel, the trans form may be selectively removed and the cis compound obained as a purified product regardless of the starting mixture composition. Also, by desorbing the trans compound from the used adsorbent, this component may be obtained in more concentrated form and even in relatively pure form if the treatment is applied in suitable procedural steps. Other examples of pairs of naphthenes which behave in this manner are cyclopentane-cyclohexane, amylcyclohexane-dicyclohexyl, and butylcyclopentylcyclopentanedicyclohexyl, the first named component in each case being the one which is selectively adsorbed throughout substantially the whole concentration range.

Some pairs of naphthenes may exhibit a behavior intermediate of the above two cases; that is, one component will be more adsorbable over most of the concentration range while the other will be selectively adsorbable over only a small although substantial part of the range. For example, one component may be more adsorbable over 90% of the range while the other is more adsorbable, although not greatly so, over only the remaining 10% of the range. With mixtures of this type the component which is adsorbable over only the small part of the range may readily be prepared in highly pure form, but a substantial purification of the other component is not so easy to accomplish although it may be done according to the present method particularly when the starting material contains a high concentration, say 97 or 98%, of this component to begin with and it is desired to effect further purification.

In practicing the invention, a charge material is selected which contains the hydrocarbons in proportions at which their adsorbabilities are substantially different and this material is treated with silica gel or a like adsorbent to selectively adsorb one of the components. In order to effect a high degree of separation, this treatment is carried out preferably by percolating the charge through a column of the adsorbent while employing a large proportion of the adsorbent. After all of the charge has passed into the adsorbent, it may be followed by a desorbing agent such as a polar organic liquid (for example, alcohol or acetone) or water to displace the adsorbate. The use of such desorbing agent is necessary where the desired component is the one which is selectively adsorbed. In the other case where the desired component is not preferentially adsorbed and therefore appears in highest purity as the first portion of efflux or filtrate from the column, a desorbing agent is not necessarily required provided sufficient charge is used to wet all of the adsorbent and produce a filtrate. Efflux from the column is collected in separate fractions as desired in order to segregate the portion which has the desired purity.

With hydrocarbons that behave as illustrated in Figure 1, the first portion of efflux or filtrate will comprise the predominant component in a relatively high state of purity as compared to the charge. Succeeding portions will decrease in purity and, as the adsorbate is displaced from the gel, the filtrate will become less pure than the charge. However, with this type of system the other component (i. e. the one present in small amount in the charge and preferentially adsorbed therefrom) will never appear in relatively high concentration but only in concentrations below that at which the two components have about the same adsorbabilities.

With the type of system as illustrated by Figure 2, the first portion of filtrate will be relatively rich, as compared to the charge, in the less adsorbable component regardless of the charge composition. Succeeding portions will become less and less rich in this component, eventually becoming enriched with respect to the more adsorbable component as it is displaced from the gel by means of the desorbing agent. Thus it is possible to obtain one component in concentrated form as the first portion of filtrate and also to obtain the other component in relatively concentrated form as the last portion of filtrate. The degree of separation between the two components will depend upon the amount of adsorbent used.

When the previously described intermediate type of behavior obtains, the first portion of filtrate will be rich with respect to the less adsorbable component and the succeeding portions will vary in composition generally as described for systems as in Figure 2. However, although it will be possible to obtain the more adsorbable component in enriched form as the last portions of filtrate, this constituent will never appear in a very high state of purity.

The following examples, in which percentages are by volume, illustrate the invention more specifically:

Example I

A column having an internal diameter of about ½ inch and a height of 3 feet was used. The column was provided with a water jacket through which ice water was circulated to absorb the heat generated due to wetting of the gel and to maintain the temperature substantially constant within a few degrees of ice temperature. Fifty milliliters of a mixture composed of 90% cyclohexane and 10% ethylcyclohexane were percolated through 84 grams of 28–200 mesh silica gel in the column. These components exhibit the type of behavior illustrated in Figure 1. After all of the hydrocarbon mixture had passed into the gel, it was followed by alcohol in order to force the hydrocarbon from the gel and produce a filtrate. The first portion of filtrate amounting to 10% of the hydrocarbon charge contained 93% cyclohexane. A higher purity could have been obtained by taking a smaller first cut or by retreating the first cut with regenerated gel.

Example II

A mixture comprising 90% cyclohexane and 10% methylcyclopentane was treated in the manner described in Example I. The total amount of charge was 50 ml. and the amount of silica gel was 80 grams. A first cut representing 18% of the charge was cyclohexane in a purity of 96% and a second cut amounting to 12% of the charge had a purity of 94%.

Example III

Twenty-four milliliters of a mixture composed of 90% dicyclohexyl and 10% trans-decalin were treated with 84 grams of silica gel in the manner described in Example I. The first portion of filtrate amounting to about 21% of the charge contained 95% dicyclohexyl

Example IV

This run differed from the previous run only in that the charge composition was reversed so that it was composed of 90% trans-decalin and 10% dicyclohexyl. The first portion of filtrate comprising about 42% of the charge contained 94% trans-decalin. By comparing this example with the previous example it may be seen that these naphthenes behave in the manner illustrated by Figure 1.

Example V

In another run in which 24 ml. of a mixture containing 90% dicyclohexyl and 10% amylcyclohexane were treated with 84 grams of silica gel as in previous examples, it was found that the first cut representing about 33% of the charge contained 94.5% dicyclohexyl.

Example VI

In another run carried out in the above manner 24 ml. of dicyclohexyl containing 10% of 2-butylcyclopentylcyclopentane as impurity were percolated through 84 grams of silica gel. The first 21% cut was dicyclohexyl in a purity of 98%.

Example VII

Twenty-four milliliters of cyclohexane containing 10% cyclopentane as impurity were treated with 84 grams of silica gel as in Example I. The first cut, which amounted to about 42% of the charge, was 96% pure cyclohexane.

In practicing the invention it generally will be desirable to reactivate the adsorbent after it has been used in order that it may be used again. This may be done by blowing the adsorbent with hot inert gas or air to drive off the adsorbed hydrocarbons or to drive off the desorbing agent if one has been used.

The temperature at which the adsorption operation is carried out may affect the efficiency of the separation and it often will be the case that a poorer separation will be obtained at elevated temperature. The operation therefore is preferably conducted at room temperature or below to insure a better separation. This generally will necessitate the provision of some means for removing any heat generated due to wetting of the adsorbent as, for instance, by providing means for circulating a cooling medium around the adsorbent column.

It is contemplated that adsorbents other than silica gel may be used in practicing the invention provided that they conform substantially to silica gel in adsorptive properties and similarly have a high activity; for example, a sufficiently highly activated alumina might be used. Other modifications of the process are permissible within the broad aspects of the invention and will be apparent to those skilled in the art.

Having described my invention, what I claim and desire to protect by Letters Patent is:

1. In a process of separating a liquid hydrocarbon mixture comprising two naphthene hydrocarbons which differ by not more than three carbon atoms per molecule and in which the two hydrocarbons have different adsorbabilities when they are present within a certain range of proportions, the steps which comprise subjecting a mixture in which the proportions of said naphthene hydrocarbons are within such proportion range to treatment in liquid phase with silica gel, thereby selectively adsorbing one of said hydrocarbons, and separating from the silica gel a fraction containing the other hydrocarbon in more nearly pure form.

2. In a process of separating a liquid hydrocarbon mixture comprising two naphthene hydrocarbons, A and B, which differ by not more than three carbon atoms per molecule and in which hydrocarbon A has a greater adsorbability than hydrocarbon B when A is present in small amount, the steps which comprise subjecting a mixture containing a small amount of A and a large amount of B to treatment in liquid phase with silica gel, thereby selectively adsorbing hydrocarbon A, and separating from the silica gel a fraction containing hydrocarbon B in a relatively pure state.

3. A process according to claim 2 in which the two naphthene hydrocarbons are isomers.

4. A process according to claim 2 in which the two naphthene hydrocarbons are adjacent homologues.

5. In a process of separating a liquid hydrocarbon mixture comprising two naphthene hydrocarbons, A and B, which differ by not more than three carbon atoms per molecule and in which hydrocarbons A and B have the same absorbability when they are present in a certain definite proportion, the steps which comprise subjecting a mixture of said naphthene hydrocarbons in which the proportion of A to B is substantially less than such definite proportion to treatment in liquid phase with silica gel, thereby selectively adsorbing hydrocarbon A, and separating from the silica gel a fraction containing hydrocarbon B in a relatively pure state.

6. A process according to claim 5 in which the two naphthene hydrocarbons are isomers.

7. A process according to claim 5 in which the two naphthene hydrocarbons are adjacent homologues.

8. In a process of separating a liquid hydrocarbon mixture comprising two naphthene hydrocarbons, A and B, which differ by not more than three carbon atoms per molecule and in which the two hydrocarbons have the same adsorbability when they are present in a certain definite proportion, the steps which comprise subjecting a mixture containing a small amount of A and a large amount of B and in which the proportion of A to B is substantially less than such definite proportion to treatment in liquid phase with silica gel, thereby selectively adsorbing hydrocarbon A and separating from the silica gel a fraction containing hydrocarbon B in a relatively pure state.

9. A process of separating two naphthene hydrocarbons which differ by not more than three carbon atoms per molecule which comprises subjecting a mixture of such hydrocarbons to treatment in liquid phase with silica gel, thereby selectively adsorbing one of said hydrocarbons, and separating from the silica gel a fraction containing the other hydrocarbon in a more nearly pure state.

10. A process according to claim 9 wherein said naphthene hydrocarbons contain the same number of carbon atoms per molecule.

11. A process according to claim 9 wherein said naphthene hydrocarbons are isomers.

12. A process according to claim 9 wherein said naphthene hydrocarbons are adjacent homologues.

13. A process for purifying a naphthene hydrocarbon which contains in admixture therewith a small amount of another naphthene hydrocarbon which differs from the first-mentioned naphthene hydrocarbon by not more than three carbon atoms per molecule which comprises subjecting the mixture to treatment in liquid phase with silica gel, thereby selectively adsorbing said other hydrocarbon which is present in small amount, and separating from the silica gel a fraction containing the desired naphthene hydrocarbon in relatively pure state.

14. A process according to claim 13 wherein said naphthene hydrocarbons contain the same number of carbon atoms per molecule.

15. A process according to claim 13 wherein said naphthene hydrocarbons are isomers.

16. A process according to claim 13 wherein said naphthene hydrocarbons are adjacent homolgues.

17. The process of separating two naphthene hydrocarbons from a mixture containing them, which hydrocarbons differ by not more than three carbon atoms per molecule and are in such proportion as to have substantially different adsorbabilities, which comprises subjecting such mixture to treatment in liquid phase with silica gel, thereby selectively adsorbing one of said hydrocarbons and separating from the silica gel a fraction containing the other hydrocarbon in a more nearly pure state.

ALFRED E. HIRSCHLER.

REFERENCES CITED

The following references are of record in the file of this patent:

Mair et al., Oil and Gas J., Sept. 19, 1935, pages 29, 30 and 32.